Jan. 5, 1943.  R. C. PIERCE  2,307,236
DRAFT GEAR
Filed July 29, 1940   4 Sheets-Sheet 1
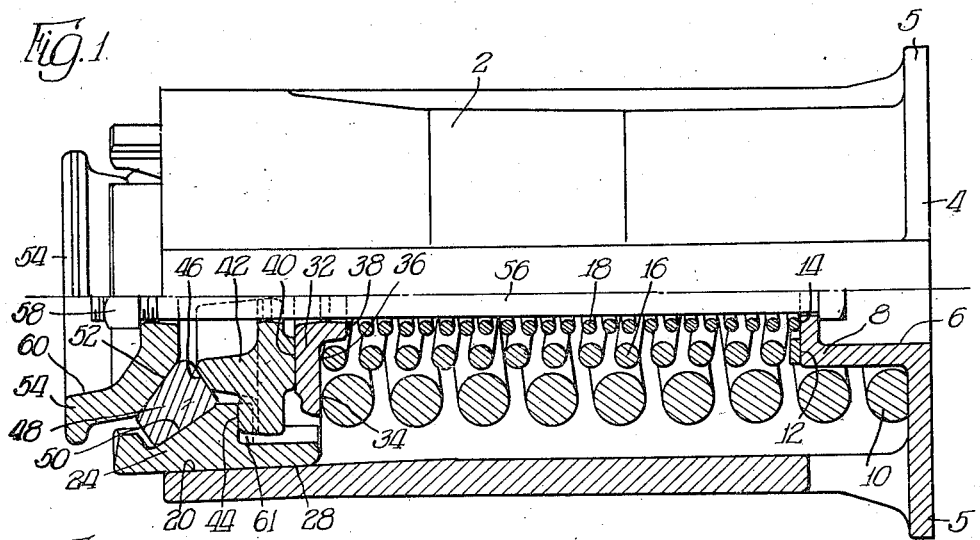
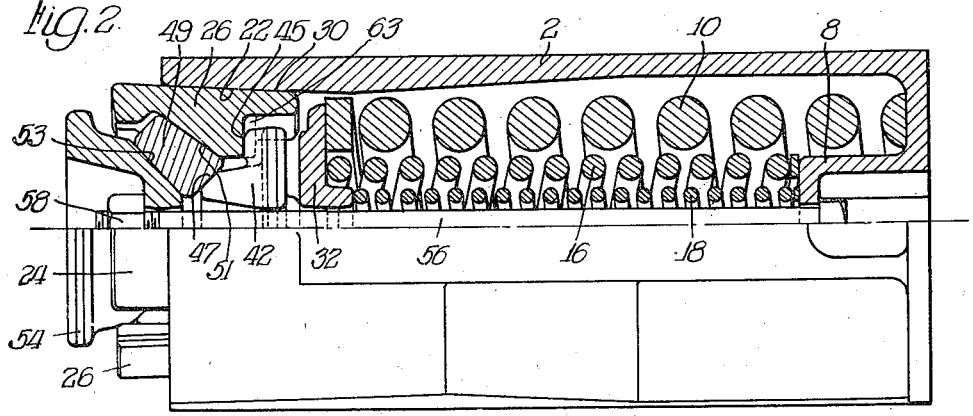
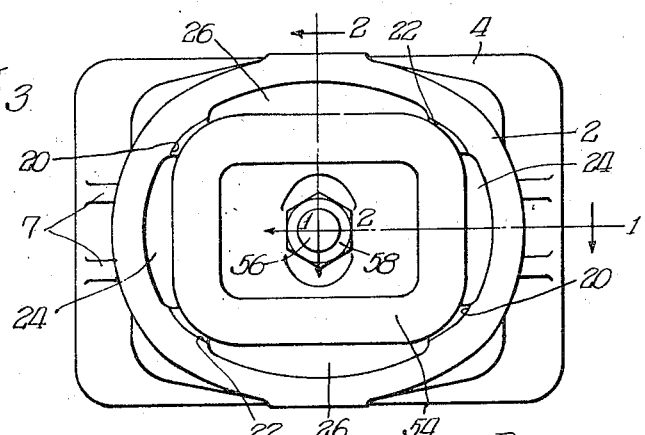
INVENTOR.
Raymond C. Pierce,
BY Jan. 5, 1943.  R. C. PIERCE  2,307,236
DRAFT GEAR
Filed July 29, 1940  4 Sheets-Sheet 2
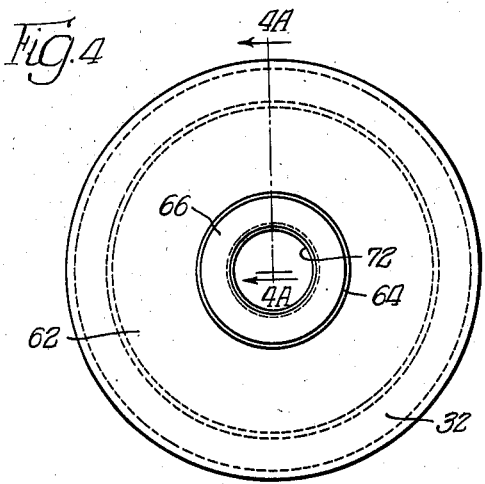
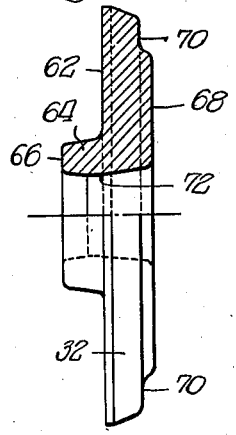
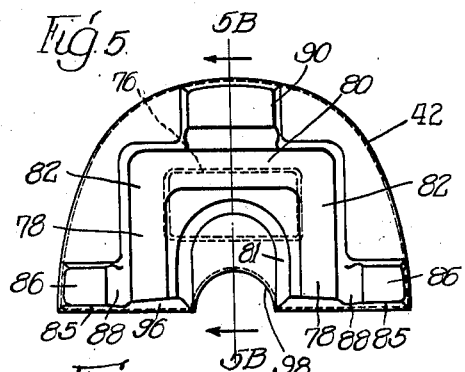
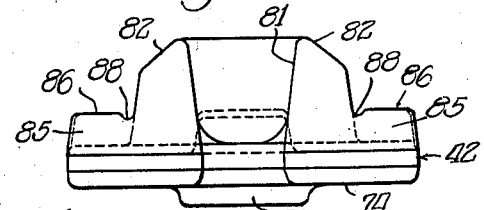
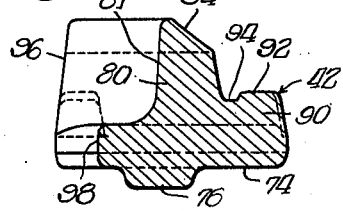
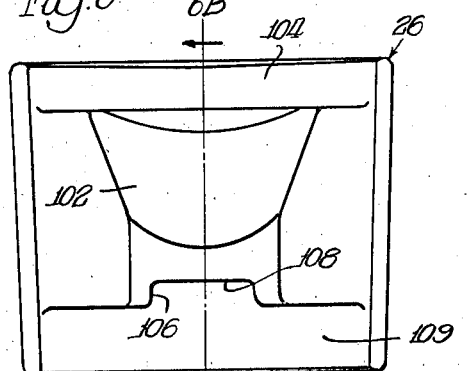
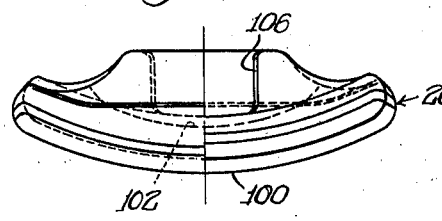
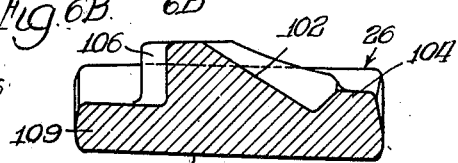
INVENTOR.
Raymond C. Pierce,
BY
atty.

Jan. 5, 1943.  R. C. PIERCE  2,307,236
DRAFT GEAR
Filed July 29, 1940  4 Sheets-Sheet 3
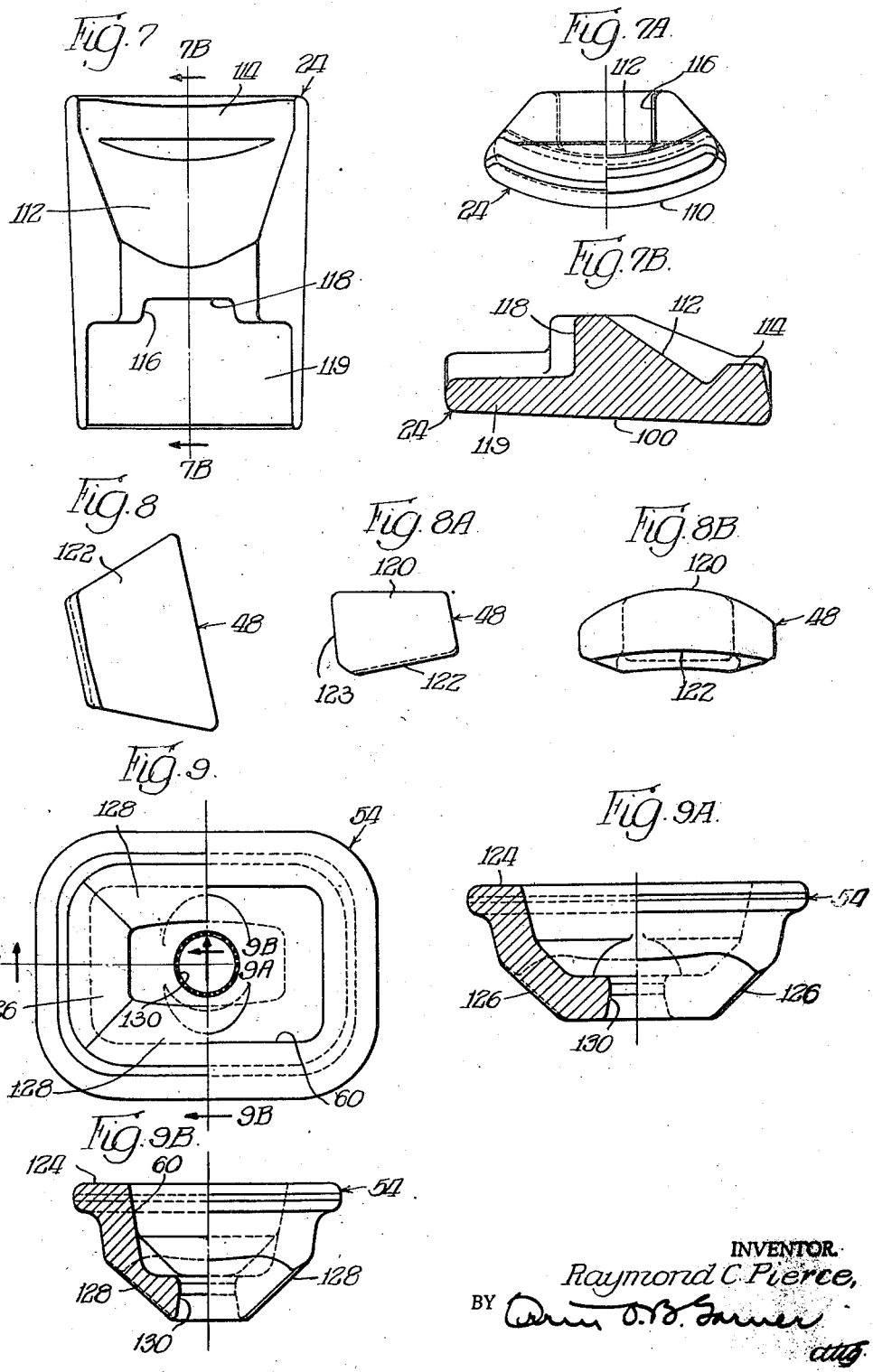
INVENTOR.
Raymond C. Pierce,
BY

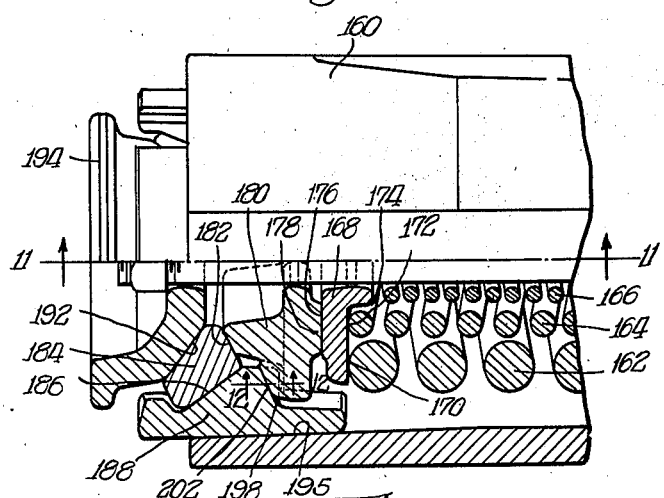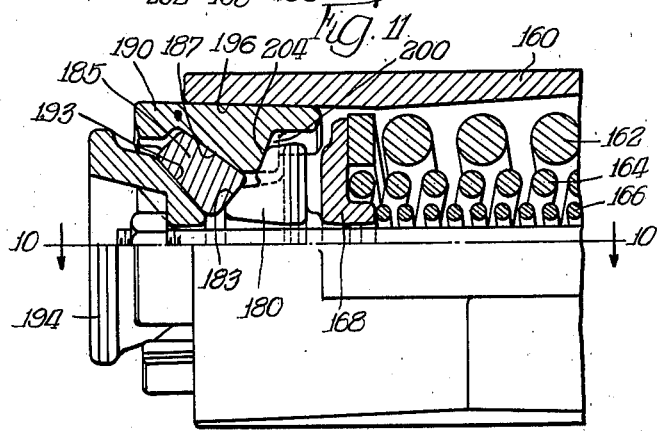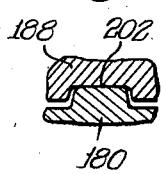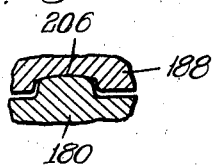

Patented Jan. 5, 1943

2,307,236

UNITED STATES PATENT OFFICE 2,307,236

DRAFT GEAR

Raymond C. Pierce, Chicago, Ill.

Application July 29, 1940, Serial No. 348,149

44 Claims. (Cl. 213—34)

My invention relates to friction absorbing devices and more particularly to a draft gear having a barrel type housing in the outer end of which may be received what is sometimes designated a clutch mechanism.

My invention contemplates such a friction draft gear having greater capacity than required by present standards and capable of withstanding heavier shocks resulting from increased loads and higher speeds.

Reference is here made to my co-pending application Serial No. 254,134, now Patent No. 2,205,066 dated June 18, 1940, showing a form of gear generally similar to that herein set forth and the present modification is an improvement thereon.

An object of my invention is to design such a draft gear wherein the clutch mechanism includes two sets of shoes aligned with the long and short diameters of an oval-shaped housing, and thrust members having diagonal face engagement with said shoes, an outer follower wedge, and equalizing means, said equalizing means having spaced fulcrum seats on a spring cap.

A further object of my invention is to design such a draft gear wherein the clutch mechanism includes insert members having engagement with two sets of shoes along relatively sharp angles and with an outer follower along relatively flat angles thereby permitting maximum frictional absorbing capacity with free release.

My invention also contemplates a clutch mechanism wherein wedges are afforded for transmitting thrust to two sets of shoes, one set of said shoes having relatively large areas engaging the housing as compared with the other set of shoes, said wedges affording means for equalizing the pressure per unit of area of said sets of shoes against the housing.

A further object of my invention is to design such a clutch mechanism wherein the sets of shoes may be interlocked with the equalizer wedges to prevent their relative rotation.

A specific object of my invention is to design such a draft gear with a housing having a generally oval shaped friction end wherein may be received a clutch mechanism comprising two sets of shoes, an outer follower, equalizer wedges seated on spring means within said housing, and insert members engaging said shoes, said outer follower and said equalizer wedges along diagonally arranged surfaces, said shoes also having engagement with said equalizer wedges along surfaces lying in a plane perpendicular to the axis of said gear.

A different object of my invention is to design such a clutch mechanism wherein the engaging surfaces between said shoes and said equalizer wedges lie in a plane inclined to the axis of said gear.

My invention also contemplates such a clutch mechanism wherein the shoes and the equalizer wedges have thrust engagement with each other along arcuate surfaces.

My invention further contemplates such a clutch mechanism wherein the equalizing means comprises two half-oval shaped members of identical form, each member having a fulcrum seat on a spring cap, said seat being spaced from the longitudinal axis of the gear such a distance that the pressure per unit area of the respective sets of shoes is equalized.

In the drawings, Figure 1 is a plan view of a draft gear embodying my invention, half in section, the section being taken substantially in a longitudinal plane bisecting said gear as indicated by line 1—1 of Figure 3.

Figure 2 is a side elevation of the draft gear shown in Figure 1, half in section, the section being taken substantially in a longitudinal plane bisecting said gear as indicated by the line 2—2 of Figure 3.

Figure 3 is an end view taken from the left of the draft gear shown in Figure 1.

Figure 4 is a plan view of the inner face of the spring cap used in my novel invention, and Figure 4A is an edge view thereof, half in section, the section being taken substantially in the plane indicated by line 4A—4A of Figure 4.

Figure 5 is a top plan view of one of the equalizer wedges used in said draft gear. Figure 5A is an end elevation thereof, and Figure 5B is a sectional view thereof, the section being taken substantially in the plane indicated by line 5B—5B of Figure 5.

Figure 6 is an elevation of a shoe of one set of shoes used in my novel draft gear, the view being taken toward the inner face thereof. Figure 6A is an end view of the shoe shown in Figure 6, the left half thereof being a view taken from the top of said shoe and the right half being a view taken from the bottom of said shoe, and Figure 6B is a sectional view taken substantially in the plane indicated by the line 6B—6B of Figure 6.

Figure 7 is an elevation of a shoe of the other set of shoes used in my draft gear, the view being taken toward the inner face thereof. Figure 7A is an end view of said shoe, the left half being taken from the top thereof and the right half being taken from the bottom thereof, and Figure 7B is a sectional view taken substantially in the plane indicated by the line 7B—7B of Figure 7.

Figure 8 is a plan view of one of the thrust members, the view being taken toward the inner face thereof. Figure 8A is a side elevation thereof. Figure 8B is an end view of the insert shown in Figure 8, the view being taken from the right thereof.

Figure 9 is a plan view of the outer follower wedge, the left half thereof being a bottom plan view and the right half thereof being a top plan view. Figure 9A is a side elevation, half in section, the section being taken substantially in the plane indicated by the line 9A—9A of Figure 9, and Figure 9B is an end view, half in section, taken from the right of Figure 9, the section being taken substantially in the plane indicated by the line 9B—9B of Figure 9.

Figure 10 is a fragmentary view, half in section, of a different modification of my novel draft gear, the section being taken substantially in a longitudinal plane bisecting said gear as indicated by the line 10—10 of Figure 11.

Figure 11 is a fragmentary view, half in section, of the draft gear shown in Figure 10, the section being taken substantially in a longitudinal plane bisecting said draft gear as indicated by the line 11—11 of Figure 10, said plane being disposed at substantially right angles to the plane indicated by the line 10—10 of Figure 11.

Figure 12 is a fragmentary sectional view showing the engagement of a shoe with an equalizer wedge, said section being taken substantially in the plane indicated by the line 12—12 of Figure 10.

Figure 13 is a fragmentary sectional view of a different modification of the engagement of a shoe with an equalizer wedge, the section being taken in substantially the same plane as that of Figure 12.

Describing my novel invention in greater detail and referring first to the modification shown in Figures 1 to 9, the housing 2 is of well-known form having a generally oval shape as best seen in Figure 3, and having a substantially rectangular base 4 with flanges 5, 5 on opposite sides thereof with reinforcing ribs 7, 7. Centrally interrupting the base 4 may be the recess 6 defined by the inwardly directed lug 8, said lug affording positioning means for the outer compression spring 10 seated on the inner surface of said base and affording seats on its inner surface as at 12 and 14 for the inner compression springs 16 and 18. Adjacent the open end of said housing may be formed two sets of diametrically opposed outwardly flaring friction surfaces 20, 20 and 22, 22, said sets of friction surfaces being disposed respectively along the long and short diameters of said housing.

A clutch mechanism may be received within the tapered open end of said housing and includes two sets of shoes 24, 24 and 26, 26 frictionally engaging as at 28, 28 and 30, 30 the respective complementary sets of surfaces 20, 20 and 22, 22 on said housing. A spring cap 32 affords seats as at 34, 36, and 38 for the compression springs 10, 16, and 18 respectively. Supported on the spring cap 32 at spaced fulcrum seats along the long diameter of said housing as at 40, 40 may be the equalizer wedges 42, 42, each equalizer wedge being of half-oval shape and identically constructed. Each wedge 42 has thrust engagement as at 44 with each shoe 24, and each shoe 26 may be afforded thrust engagement as at 45 with both wedges 42, 42, the thrust engagement of said shoes 24, 24 and 26, 26 with said equalizer wedges being along surfaces at right angles to the axis of said gear. Each wedge 42 may also have diagonal face engagement as at 46 with an insert or thrust member 48 associated with each shoe 24, and diagonal face engagement as at 47 with an insert member 49, associated with each shoe 26. It may be noted that each insert member 49 engages both equalizer wedges 42, 42. The insert members 48, 48 and 49, 49 also have diagonal cylindrical face engagement as at 50, 50 and 51, 51 with the respective adjacent shoes. Diagonal relatively shallow cylindrical face engagement as at 52 and 53 may be afforded respectively between each insert member 48 and 49 and the outer wedge follower 54. The draft gear may be retained in assembly by the bolt 56 having its head seated within the recess 6 and having threaded engagement at its opposite end with the nut 58 within the cavity 60 on the outer wedge follower 54. The sets of shoes 24, 24 and 26, 26 are afforded tongue and groove engagement as at 61, 61 and 63, 63 respectively with the equalizer wedges 42, 42 to substantially prevent relative rotation therebetween. The engagement of the parts of the clutch mechanism may be best understood from a detailed description of each part.

The spring cap 32 is shown in detail in Figures 4 and 4A, and comprises a generally circular disc affording on its inner surface 62 seats for the compression springs 10 and 16 as afore described. The central annular flange 64 affords positioning means for the spring 16, and its outer annular surface 66 affords a seat for the innermost compression spring 18. The flat outer face 68 may be annularly relieved along its outer edges as at 70, and the central hole 72 defined by oppositely directed flaring walls receives the bolt 56.

The detailed structure of each equalizer wedge 42 may be best seen from a consideration of Figures 5, 5A, and 5B. Each equalizer wedge 42 may be of generally half-oval shape and may have on its bottom surface 74 a substantially rectangular bearing pad or fulcrum 76 centrally disposed along the long diameter of the half-oval with the long axis of said pad being spaced from and substantially parallel to the short diameter of the oval. On the upper surface of each wedge 42 may be formed parallel upstanding slightly tapered walls 78, 78 merging at one of their ends with an upstanding tapered wall 80, said walls 78, 78 and 80 forming substantially a U and defining a recess or cavity 81. The top diagonally arranged flat surfaces 82, 82 on said walls 78, 78 and the top diagonally arranged flat surface 84 on the end wall 80 engage as at 47, 47, and 46 the respective insert members 49, 49, and 48. Outwardly of each wall 78 and adjacent the short diameter of the oval may be formed a tongue 85 of tapered cross-section with an upper surface 86 having engagement as at 45 with the adjacent shoe 26, said surface being relieved as at 88 adjacent the wall 78. A tongue 90 may be similarly formed outwardly of the wall 80 in alignment with the long diameter of the oval, said tongue 90 having an upper surface 92 for engagement with the adjacent shoe 24, said surface being relieved as at 94 adjacent the end wall 80. The tongues 85, 85 and 90 afford interlocking engagement with grooves on the sets of shoes as previously described. Each tongue 85 may be approximately one-half the width of tongue 90 and the reception of adjacent tongues 85, 85 within a groove on each shoe 26 limits relative movement between the equalizer wedges 42, 42 transversely of said gear. It may be noted that the surfaces on each wedge 42 along the short diameter of said oval may be inclined as at 96 to afford slight limited rocking movement of said wedges on the fulcrums 76, 76. The semi-circular recess 98 accommodates the retaining bolt 56.

The detailed structure of each shoe 26 is shown in Figures 6, 6A and 6B. Each shoe 26 may be of arcuate shape as best seen in Figure 6A, and may be slightly tapered toward its inner end, as best seen in Figure 6, to accommodate said shoe within the housing 2. The arcuate outer face 100 of said shoe is complementary to the friction surfaces 22, 22 formed on said housing, and the inner face of said shoe is afforded an arcuately relieved diagonally arranged surface 102 for complementary engagement with the associated insert 49. The upper end of said surface 102 may be defined by the transverse shoulder 104 and clearance may be afforded between said shoulder and the associated insert 49 when assembled. Adjacent the inner end of said shoe and intermediate its sides may be formed a slot or groove 106, the surface 108 defining the top of said groove having engagement with the top surfaces 86, 86 of the adjacent tongues 85, 85 on the equalizer wedges 42, 42. A flange 109 affords additional bearing area against the housing 2.

The details of each shoe 24 are shown in Figures 7, 7A and 7B, each shoe 24 having an arcuate outer face 110 engaging the adjacent complementary surface 20 on said housing and having on its inner face a diagonally arranged cylindrical surface 112 for complementary engagement with the associated insert member 48, said surface 112 being defined at its upper end by the transverse shoulder 114. In assembly clearance may be afforded between the shoulder 114 and the associated thrust member 48. Adjacent the inner end of said shoe may be formed a slot 116, the surface 118 defining the top of said slot having engagement with the surface 92 formed on the tongue 90 on the equalizer wedge 42. A flange 119 serves to enlarge the bearing area of surface 110 against the housing.

The insert members 48, 48 and 49, 49 are identical in form and the details thereof may be best seen from a consideration of Figures 8, 8A and 8B. Each insert 48 and 49 comprises a solid block of metal substantially wider at its outer end than at its inner end to accommodate seating on the adjacent shoe. The outer face 120 may be generally cylindrical for complementary engagement with the inner face of the adjacent shoe, and the inner face 122 of said insert may be slightly arcuately relieved for engagement with a complementary surface on the outer follower wedge 54. The inner end 123 of each insert may be somewhat thicker than its outer end and may seat against an adjacent diagonally arranged surface on a wall of said equalizer wedge 42.

The outer follower wedge 54 (Figures 9, 9A, and 9B) may be of generally rectangular shape having a flat peripheral outer face 124 for abutment with an associated follower block, said face being interrupted by the generally rectangular cavity 60 in which may be received the securing nut 58. Two sets of slightly arcuately relieved diagonally arranged faces 126, 126 and 128, 128 aligned with the long and short axes of said wedge 54 are afforded on its inner surfaces for complementary engagement with the inner surfaces 122, 122 on the inserts 48, 48 and 49, 49. The opening 130 accommodates the retaining bolt 156.

In operation, the clutch mechanism is urged further into the housing and compresses the coil springs. The wedging action of the outer follower wedge 54 and the equalizing wedges 42, 42 on the thrust members 48, 48 and 49, 49 urge the thrust members against the shoes 24, 24 and 26, 26 and force them outward against the respective sets of friction surfaces on the housing. As the clutch mechanism continues to move inward the flaring friction surfaces on the housing force the friction shoes toward the axis of the gear and the thrust members are "squeezed" between the shoes, the equalizing wedges and outer follower wedge. The engagement between the shoes and equalizing wedges affords further frictional resistance. Since thrust is transmitted between each wedge and the spring cap at the fulcrum 76, and each wedge has thrust engagement with one shoe 24 and both shoes 26, 26, equalization of pressure between the sets of shoes is maintained.

The fulcrum point 76, as shown, is so positioned as substantially to equalize the pressure distribution between the shoes. It will be clear, however, that said fulcrum point may be moved radially outwardly on the long axis to increase the pressure on the small shoes while decreasing the pressure on the large shoes; or it may be moved in the reverse direction, that is radially inwardly on said long diameter thus decreasing the pressure on the small shoes and increasing it on the long shoes. In such manner convenient means is afforded for altering the shoe pressures as described in various modifications of the gear.

The relatively acute angle of the face engagement of the thrust member with the shoes affords means whereby maximum pressures are transmitted through said shoe to said housing, while the relatively flat angle of the face engagement of said inserts with said outer follower wedge permit the outer follower wedge to freely return to its normal released position without sticking. The remaining parts of the clutch mechanism are free to return to their normal released positions upon release of the outer follower wedge.

In the modification shown in Figures 10 to 12 inclusive, the draft gear is substantially similar to the previous modification and differs therefrom in that the engagement of the shoes with the equalizer wedges is along surfaces lying in planes inclined to the longitudinal axis of said gear. The draft gear comprises an oval shaped housing 160 enclosing a plurality of compression springs 162, 164, and 166 seated at one of their ends on the base of said housing (not shown) and at their other ends on the spring cap 168 as at 170, 172 and 174 respectively. The spring cap 168 may be identical with that in the previous modification and seated thereon as at 176, 176 may be rectangular bearing pads or fulcrums 178, 178 formed on the inner surfaces of equalizer wedges 180, 180. Diagonal face engagement as at 182 and 183 may be afforded between each equalizer wedge and each insert or thrust member 184 and 185, and the inserts 184, 184 and 185, 185 may have cylindrical diagonal face engagement as at 186, 186 and 187, 187 with the respective sets of shoes 188, 188 and 190, 190. Diagonal face engagement as at 192, 192 and 193, 193 may be afforded between the outer follower 194 and the respective inserts 184, 184 and 185, 185. The set of shoes 188, 188 disposed along the short diameter of said oval housing frictionally engages an outwardly flaring set of diametrically opposed friction surfaces 195, 195 on said housing and the set of shoes 190, 190 likewise has frictional engagement with a set of diametrically opposed outwardly flaring friction surfaces 196, 196 formed along the long diameter of said housing. The set of shoes 190, 190 may have relatively large frictional engaging areas as compared with the set of shoes 188, 188.

Each shoe 188 and 190 has tongue and groove engagement as at 198 and 200 with the equalizer wedges 180, 180 as in the previous modification whereby relative rotation therebetween is substantially eliminated. Each shoe 190 engages both equalizer wedges 180, 180 and likewise each insert member 185 associated with each shoe 190 engages both equalizer wedges.

In this modification each shoe 188 has diagonal flat face engagement as at 202 with an equalizer wedge 180 at the tongue and groove engagement of said shoe with said wedge, and each shoe 190 has diagonal flat face engagement as at 204 with both of the equalizer wedges 180, 180 at the tongue and groove engagement 200. In Figure 12 the face engagement of shoe 188 with the equalizer wedge 180 is best shown, and the diagonal flat face engagement of the shoes 190, 190 with the equalizer wedges 180, 180 is substantially similar. It may be noted that the diagonal face engagement of the sets of shoes 188, 188 and 190, 190 increases the frictional absorption of the clutch mechanism during operation.

The spring cap 168, the inserts 184, 184 and 185, 185, and the outer follower 194 may be identical with the corresponding parts of the previous modification, and the sets of shoes 188, 188 and 190, 190, and the equalizer wedges 180, 180 may be identical with the corresponding parts of the previous modification except for the diagonal face engagement at 202 and 204 as above described.

A further modification of the engagement between the sets of shoes and the equalizer wedges is shown in Figure 13 wherein diagonal arcuate face engagement as at 206, 206 is afforded between the sets of shoes 188, 188 and the equalizer wedges 180, 180. Diagonal arcuate face engagement between shoes 190, 190 and the equalizing wedges 180, 180 is substantially similar to that shown at 206 except that the groove in shoe 190 will receive adjacent tongues on wedges 180, 180, each tongue having an arcuate top surface engaging the complementary top surface of the groove on each shoe 190. It is apparent that arcuate face engagement between the shoes and the equalizer wedges may be afforded in the modification shown in Figures 1 to 9 as well as the modification shown in Figures 10 to 12.

The operation of the draft gears shown in the last two modifications is generally similar to that of the first modification. The diagonal face engagement between the shoes and the equalizer wedges serves to urge the friction shoes outward into tighter frictional engagement with the housing, increase the pressure between the shoes and the housing, thereby affording a draft gear of maximum frictional capacity.

It will be apparent to those skilled in the art that I have designed a draft gear wherein wedge means of novel form are included in the clutch mechanism and afford equalization of pressure per unit of area between two sets of shoes and an oval shaped housing where one set of shoes is afforded greater frictional area than the other set.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a draft gear, a barrel having an oval friction end, sets of outwardly flaring diametrically opposed friction surfaces aligned along the long and short diameters of said oval end, spring means, a spring cap on said spring means, and a clutch mechanism seated on said spring cap, said clutch mechanism comprising pairs of friction shoes engaging respective sets of said friction surfaces, an outer follower wedge, inner equalizing wedges, sets of thrust members associated respectively with said pairs of shoes and having diagonal face engagement with said outer follower wedge, the respective pairs of shoes and said equalizing wedges, each equalizing wedge having thrust engagement with one shoe of one pair and both shoes of the other pair and having a fulcrum seat on said spring cap along the long diameter of said oval end.

2. In a draft gear, a barrel having an oval friction end, sets of outwardly flaring diametrically opposed friction surfaces aligned along the long and short diameters of said oval end, spring means, a spring cap on said spring means, and a clutch mechanism seated on said spring cap, said clutch mechanism comprising pairs of friction shoes engaging respective sets of said friction surfaces, an outer follower wedge, inner equalizing wedges, sets of thrust members associated respectively with said pairs of shoes and having diagonal face engagement with said outer follower wedge, the respective pairs of shoes and said equalizing wedges, each equalizing wedge having thrust engagement with one shoe of one pair and both shoes of the other pair and having a fulcrum seat on said spring cap.

3. In a draft gear, a friction barrel having an oval end, sets of outwardly flaring internal friction surfaces arranged within said end, spring means within said barrel, a spring cap on said spring means, and a clutch mechanism seated on said cap, said clutch mechanism comprising an outer follower wedge, a pair of equalizer wedges having thrust engagement with said spring cap, sets of friction shoes engaging respective sets of surfaces, and sets of thrust members having diagonal face engagement with said outer follower wedge, said equalizer wedges, and respective sets of shoes, said sets of shoes having thrust engagement with said equalizer wedges, certain associated sets of shoes and thrust members having thrust engagement with both equalizer wedges.

4. In a draft gear, a housing having a friction end with internal outwardly flaring friction surfaces, spring means, a spring cap on said means, and a clutch mechanism comprising sets of friction shoes seated against said friction surfaces with one of said sets having relatively large friction areas as compared with the other of said sets, inner and outer wedge means, and thrust members extending between and engaging said wedge means and having thrust engagement with said shoes, said inner wedge means including a pair of members each having thrust engagement with certain of said shoes and each having relatively small bearing on said spring cap spaced from the longitudinal axis of said gear, whereby said inner wedge means equalizes the pressure per unit of area between the sets of shoes.

5. In a draft gear, a housing having an oval friction end with sets of internal outwardly flaring friction surfaces aligned along the long and short diameters of said oval end, spring means, a spring cap on said means, and a clutch mechanism comprising pairs of friction shoes seated against respective sets of said friction surfaces, an outer follower wedge, a pair of inner wedges, and thrust members extending beetween and engaging said outer and inner wedges and having thrust engagement with respective shoes, each of said inner wedges having thrust engagement with both shoes of one pair and having a fulcrum seat against said spring cap, and means on each of said inner wedges interlocking with said last-mentioned pair to limit transverse movement of said inner wedges.

6. In a draft gear, a housing having an oval friction end with sets of internal outwardly flaring friction surfaces aligned along the long and short diameters of said oval end, spring means, a spring cap on said means, and a clutch mechanism comprising sets of friction shoes seated against respective sets of said friction surfaces, an outer follower wedge, a pair of inner wedges, and thrust members extending between and engaging said outer and inner wedges and having thrust engagement with said shoes, said inner wedges having thrust engagement with said shoes and having spaced fulcrum seats against said spring cap, each shoe of one set bearing against both inner wedges, and each shoe of the other set bearing against one only of said inner wedges.

7. In a draft gear, a barrel having an oval friction end, sets of outwardly flaring diametrically opposed friction surfaces aligned along the long and short diameters of said oval end, spring means, a spring cap on said means, and a clutch mechanism seated on said spring cap, said clutch mechanism comprising sets of friction shoes engaging respective sets of said friction surfaces, an outer follower wedge, equalizing wedges each bearing on said cap at areas spaced from the short diameter of said oval end, sets of thrust members associated respectively with said sets of shoes and having diagonal face engagement with said outer follower wedge, the respective sets of shoes and said equalizing wedges, each equalizing wedge having thrust frictional engagement with certain of said shoes along surfaces lying in a plane at right angles to the axis of said gear.

8. In a draft gear, a housing having a friction end with internal outwardly flaring friction surfaces, spring means, a spring cap thereon, sets of friction shoes engaging said friction surfaces, inner wedge means on said cap and having frictional engagement with said shoes, outer wedge means, and thrust members in diagonal face engagement with respective shoes and both of said wedge means, said shoes being adapted to move inwardly in engagement with said surfaces and toward the axis of said gear whereby said inner wedge means may develop friction with said shoes during actuation thereof, said inner wedge means comprising a plurality of members rockingly seated on said cap.

9. In a draft gear, a barrel having an oval friction end, sets of outwardly flaring diametrically opposed friction surfaces aligned along the long and short diameters of said oval end, spring means, a spring cap on said means, and a clutch mechanism seated on said spring cap, said clutch mechanism comprising sets of friction shoes engaging respective sets of said friction surfaces, an outer follower wedge, equalizing wedges, sets of thrust members associated respectively with said sets of shoes and having diagonal face engagement with said outer follower wedge, the respective sets of shoes and said equalizing wedges, said equalizing wedges having spaced seats on said cap and frictional engagement with certain of said shoes along surfaces lying in a plane at right angles to the axis of said gear.

10. In a draft gear, a friction barrel having an oval end, sets of outwardly flaring internal friction surfaces arranged within said end, spring means within said barrel, a spring cap on said means, and a clutch mechanism seated on said spring cap, said mechanism comprising an outer follower wedge, a pair of equalizer wedges each having thrust engagement with said cap at a point spaced from the short diameter of said oval end, sets of friction shoes engaging respective sets of said surfaces, and sets of thrust members having diagonal face engagement with said outer follower wedge, said equalizer wedges, and respective sets of said shoes, each shoe of one set having diagonal thrust engagement with one of said equalizer wedges, and each shoe of the other set having diagonal thrust engagement with both of said edqualizer wedges.

11. In a draft gear, a barrel type housing having an oval friction end, sets of outwardly flaring diametrically opposed friction surfaces aligned along the long and short diameters of said oval end, spring means within said housing, a spring cap on said means, a clutch mechanism and a retaining bolt, said clutch mechanism comprising sets of shoes engaging respective sets of surfaces, an outer follower wedge, equalizing means, thrust members having diagonal face engagement with said outer follower wedge, the respective shoes, and said equalizing means, said equalizing means comprising a plurality of members, each of said members having thrust engagement with both shoes of one set and one shoe of another set and transmitting thrust to said spring cap at a seat spaced from the short diameter of said end.

12. In a draft gear, a housing having a friction end with internal friction surfaces, spring means including a spring cap, sets of friction shoes engaged with said surfaces, inner and outer wedge means, and thrust members having diagonal frictional engagement with both of said wedge means and having thrust engagement with respective shoes, said inner wedge means having frictional engagement with one of the shoes of one set and a plurality of shoes of another set and a seat on said spring cap.

13. In a draft gear, a housing having a friction end with an internal outwardly flaring friction surface, spring means, a spring cap thereon, friction shoes engaging said surface, a plurality of inner wedge members rockingly seated on said cap and in flat face frictional engagement with said shoes, outer wedge means, and thrust members in diagonal face engagement with respective shoes, said outer wedge means, and respective members.

14. In a draft gear, a housing having a friction end with internal outwardly flaring friction surfaces, spring means, a spring cap thereon, sets of friction shoes engaging said friction surfaces, inner wedge means seated on said cap and in flat face frictional engagement with said shoes at surfaces lying in a plane at right angles to the axis of said gear, outer wedge means, and thrust members in diagonal face engagement with respective shoes and both of said wedge means.

15. In a draft gear, a housing having an oval friction end with internal outwardly flaring friction surfaces, spring means, a spring cap thereon, and a clutch mechanism comprising sets of friction shoes seated against said friction surfaces, inner and outer wedge means, and thrust members extending between and engaging said wedge means and having thrust engagement with respective shoes, one of said wedge means including a plurality of members, each having frictional engagement with both shoes of one set and with one shoe of the other set, said last-mentioned wedge means having spaced members comprising pads seated on said cap for transmitting thrust to said spring means.

16. In a draft gear, equalizing means comprising a pair of members, each of said members comprising a bearing pad on one surface thereof for abutment with an associated spring cap, and a plurality of bearing pads on the opposite surface thereof for interlocking engagement with a plurality of associated friction shoes.

17. In a draft gear, a housing having an oval friction end with internal outwardly flaring friction surfaces, spring means with a spring cap thereon, and a clutch mechanism comprising sets of friction shoes seated against said friction surfaces, inner and outer wedge means, and thrust members having frictional engagement with both of said wedge means and having thrust engagement with respective shoes, one of said wedge means including a plurality of members, each having frictional engagement with certain of said shoes along surfaces lying in planes at right angles to the axis of said gear and each having a fulcrum seat on said spring means.

18. In a draft gear, a housing having a friction end with internal outwardly flaring friction surfaces, spring means, a spring cap thereon, friction shoes engaging said surfaces, equalizing means comprising a plurality of members rockingly seated on said cap and in flat face frictional engagement with said shoes at surfaces lying in a plane at right angles to the axis of the gear, an outer follower wedge, and thrust members in diagonal face engagement with respective shoes, said follower wedge and said equalizing means.

19. In a draft gear, a housing having an oval friction end with internal outwardly flaring fricsurfaces, spring means including a spring cap, and a clutch mechanism comprising sets of friction shoes seated against said friction surfaces, inner and outer wedge means, and thrust members having diagonal frictional engagement with both of said wedge means and having thrust engagement with respective shoes, said inner wedge means comprising a plurality of members, each having arcuate frictional engagement with one of the shoes of one set and a plurality of shoes of another set and a seat on said spring cap.

20. In a draft gear, a housing having a friction end with internal outwardly flaring friction surfaces, spring means, a spring cap thereon, friction shoes engaging said friction surfaces, inner wedge means comprising a plurality of members rockingly seated on said cap and having frictional engagement with said shoes, outer wedge means, and thrust members in diagonal face engagement with respective shoes and both of said wedge means, said shoes being adapted to move inwardly and toward the axis of said gear during actuation thereof.

21. In a draft gear, a housing having a friction end, a compression spring with a spring cap thereon received within said housing, and a clutch mechanism including an outer wedge, a plurality of inner wedges seated on said cap, and sets of associated friction shoes and thrust members, said shoes frictionally engaging said end, and each of said thrust members frictionally engaging the associated shoe and said outer wedge, each inner wedge having frictional engagement with the thrust members and associated shoes of one set and with one thrust member and associated shoe of another set.

22. In a draft gear, a housing having a friction end, a compression spring with a spring cap thereon received within said housing, and a clutch mechanism including an outer wedge, a plurality of inner wedges each having a pad bearing on said cap, and sets of associated friction shoes and thrust members, said shoes frictionally engaging said end, and each of said thrust members frictionally engaging the associated shoe and said outer wedge, each inner wedge having frictional engagement with the thrust members and associated shoes of one set and with one thrust member and associated shoe of another set.

23. In a draft gear, a housing having a friction end, a compression spring with a spring cap thereon received within said housing, and a clutch mechanism including an outer wedge, a plurality of inner wedges each bearing on said cap at points spaced from the longitudinal axis of said gear, and sets of associated friction shoes and thrust members, said shoes frictionally engaging said end, and each of said thrust members frictionally engaging the associated shoe and said outer wedge, each inner wedge having frictional engagement with the thrust members and associated shoes of one set and with one thrust member and associated shoe of another set.

24. In a draft gear, a housing having an oval friction end, a compression spring with a spring cap thereon received within said housing, and a clutch mechanism including an outer wedge, a plurality of inner wedges each bearing on said cap at areas aligned with the long diameter of said oval end, and sets of associated friction shoes and thrust members, said shoes frictionally engaging said end, and each of said thrust members frictionally engaging the associated shoe and said outer wedge, each inner wedge having frictional engagement with the thrust members and associated shoes of one set and with one thrust member and associated shoe of another set.

25. In a draft gear, a housing presenting internal friction surfaces, a compression spring with a spring cap thereon within said housing, and friction means including an outer wedge, inner equalizing wedges seated on said cap, sets of shoes frictionally engaging said surfaces respectively, and a set of thrust means associated with each set of shoes and having diagonal face engagement with said outer wedge and the associated set of shoes, each equalizing wedge having diagonal face engagement with one set of thrust members and the associated set of shoes and with a thrust member and shoe of another set of thrust members and set of associated shoes respectively.

26. In a draft gear, a housing presenting internal friction surfaces, a compression spring with a spring cap thereon within said housing, and friction means including an outer wedge, inner equalizing wedges seated on said cap, sets of shoes frictionally engaging said surfaces respectively, and a set of thrust means associated with each set of shoes and having diagonal face engagement with said outer wedge and the associated set of shoes, each equalizer wedge having diagonal face engagement with one set of thrust members and with a thrust member of another set, and having frictional engagement in planes at right angles to the axis of said gear with one set of shoes and with a shoe of another set.

27. In a draft gear, a housing presenting internal friction surfaces, a compression spring with a spring cap thereon within said housing, and friction means including an outer wedge, inner equalizing wedges seated on said cap, sets of shoes frictionally engaging said surfaces respectively, and a set of thrust means associated with each set of shoes and having diagonal face engagement with said outer wedge and the associated set of shoes, each equalizer wedge having diagonal face engagement with one set of thrust members and with a thrust member of another set, and having diagonal arcuate frictional engagement with one set of shoes and with a shoe of another set.

28. In a draft gear, a housing presenting internal friction surfaces, a compression spring with a spring cap thereon within said housing, and friction means including an outer wedge, inner equalizing wedges seated on said cap, sets of shoes frictionally engaging said surfaces respectively, and a set of thrust means associated with each set of shoes and having diagonal face engagement with said outer wedge and the associated set of shoes, each equalizer wedge having diagonal face engagement with one set of thrust members and with a thrust member of another set, and having diagonal thrust engagement with one set of shoes and with a shoe of another set.

29. In a draft gear, a housing presenting internal friction surfaces, a compression spring with a spring cap thereon within said housing, and friction means including an outer wedge, inner equalizing wedges each having pads of relatively small area seated on said cap, sets of shoes frictionally engaging said surfaces respectively, and a set of thrust means associated with each set of shoes and having diagonal face engagement with said outer wedge and the associated set of shoes, each equalizer wedge having diagonal face engagement with one set of thrust members and with a thrust member of another set, and having frictional engagement with one set of shoes and with a shoe of another set.

30. Equalizing means for a draft gear of the clutch type comprising a plurality of semi-oval members each having a top and a bottom surface, said top surface comprising a plurality of vertical walls formed and arranged for diagonal face engagement with associated thrust members, and a plurality of tongues formed and arranged for thrust engagement with associated shoes, said bottom surface comprising a bearing pad affording a fulcrum on an associated spring cap.

31. In a draft gear, equalizing means comprising a pair of semi-oval members, each of said members comprising a bearing pad on one surface thereof for abutment with an associated spring cap, and a plurality of bearing pads on the opposite surface thereof for interlocking engagement with a plurality of associated friction shoes.

32. In a draft gear, a housing having a friction end with internal outwardly flaring friction surfaces, spring means, a spring cap thereon, sets of friction shoes engaging said friction surfaces, inner wedge means on said cap and having frictional engagement with said shoes, outer wedge means, and thrust members in diagonal face engagement with respective shoes and both of said wedge means, said shoes being adapted to move toward the axis of said gear during actuation thereof and otherwise to remain at all times at substantially the same distance from said spring cap, said inner wedge means comprising a plurality of members rockingly seated on said cap.

33. In a draft gear, a housing having a friction end with internal outwardly flaring friction surfaces, spring means, a spring cap thereon, friction shoes seated against said surfaces, inner wedge means comprising a plurality of members rockingly seated on said cap and each having flat face frictional engagement with certain of said shoes, outer wedge means, and thrust members in diagonal face engagement with respective shoes, respective of said members, and said outer wedge means, said shoes being adapted to move along said surfaces and toward the axis of said gear during actuation thereof.

34. In a draft gear, a housing having a friction end with a tapering friction surface, a compression spring, a spring cap, a two piece equalizer, a follower wedge, and sets of friction shoes seated against said surface between said wedge and said equalizer, each equalizer piece having a single bearing on its inner surface engaging said spring cap and a plurality of bearings on its outer surface engaging one shoe of one set and both shoes of the other set.

35. In a draft mechanism, a housing having an open end with symmetrically arranged tapering friction faces arranged along axes substantially at right angles to each other, sets of friction shoes seated against said surfaces along said axes respectively, outer wedge means having diagonal flat face engagement against each of said shoes, inner and outer compression springs, and two equalizer members positioned between said springs and said shoes, each of said shoes having a slotted inner end for interlocking engagement with a bearer on the associated equalizer member, each shoe of one set having abutment with a single bearer of an associated equalizer and each shoe of the other set having abutment with a plurality of bearers associated with respective equalizer members.

36. In a draft mechanism, a housing having an open end with symmetrically arranged tapering friction faces arranged along axes substantially at right angles to each other, sets of friction shoes seated against said surfaces along said axes respectively, outer wedge means having diagonal flat face engagement against each of said shoes, inner and outer compression springs, and two equalizer members positioned between said springs and said shoes, each of said members bearing against two shoes of one set and one shoe of the other set, each of said shoes having a slotted inner end for interlocking engagement with a bearer on the associated equalizer member, each of said bearers having diagonal face engagement with the associated shoe.

37. In a draft mechanism, a housing having an open end with friction faces arranged along axes substantially at right angles to each other, sets of friction shoes seated against said surfaces along said axes respectively, outer wedge means having diagonal flat face engagement against each of said shoes, inner and outer compression springs, and two equalizers positioned between said springs and said shoes, each shoe of one set having abutment with one of said equalizers, and both shoes of the other set having abutment with both of said equalizers.

38. In a draft mechanism, a housing having an open end with friction faces arranged along axes substantially at right angles to each other, sets of friction shoes seated against said surfaces along said axes respectively, outer wedge means having diagonal flat face engagement against each of said shoes, inner and outer compression springs, and two equalizers positioned between said springs and said shoes, the shoes of one set being interlocked with the respective equalizers, and each shoe of the other set being interlocked with both of said equalizers.

39. In a draft mechanism, a housing having an open end with symmetrically arranged tapering friction faces arranged along axes substantially at right angles to each other, two sets of friction shoes seated against said surfaces along said axes respectively, outer wedge means having engagement with each of said shoes, inner and outer compression springs, and two equalizer members positioned between said springs and said shoes, each equalizer member bearing against three of said shoes, each of said shoes having a slotted inner end for interlocking engagement with a bearer on the associated equalizer member.

40. In a draft gear, a housing having an open end with friction faces therearound, pairs of friction shoes seated against said surfaces along axes substantially at right angles to each other, outer wedge means, a compression spring, and equalizer means interposed between said shoes and said spring, said equalizer means comprising two elements each having diagonal face engagement with one shoe of one set and with both shoes of the other set.

41. In a draft gear, a housing having a friction end with tapering friction faces therearound, two pairs of friction shoes seated against said faces respectively, outer wedge means engaging said shoes, concentric compression springs, and equalizer means interposed between said shoes and said springs, said equalizer means comprising identical equalizer members at opposite sides of the gear, each of said equalizer members bearing against three of said shoes and having diagonal face engagement with at least one shoe of each pair.

42. In a draft gear, a housing having two pairs of diametrically opposed friction faces, friction shoes seated thereagainst, outer wedge means abutting said shoes, a compression spring, and two co-planar equalizers interposed between said spring and said shoes, each equalizer bearing against three of said shoes.

43. As a new article of manufacture, a draft gear equalizer adapted to be disposed substantially at one side of the longitudinal axis of an associated draft gear and having on one face thereof three bearers elevated therefrom and arranged about the perimeter thereof, and on the opposite face thereof a single bearer elevated therefrom and being centrally located with respect to all of the first-mentioned bearers, said single bearer affording a fulcrum about which said equalizer may rock.

44. As a new article of manufacture, a draft gear equalizer adapted to be disposed substantially at one side of the longitudinal axis of an associated draft gear and having on one face thereof a single bearer elevated therefrom, said equalizer having on the opposite face thereof three bearers elevated therefrom and arranged about the perimeter thereof, said single bearer having a position intermediate with respect to any adjacent two of said last-mentioned bearers and having a position intermediate with respect to one of said last-mentioned bearers only and the edge of said equalizer adjacent said axis.

RAYMOND C. PIERCE.